US011692515B2

United States Patent
Markusic et al.

(10) Patent No.: US 11,692,515 B2
(45) Date of Patent: *Jul. 4, 2023

(54) LIQUID ROCKET ENGINE TAP-OFF POWER SOURCE

(71) Applicant: FireFly Aerospace Inc., Cedar Park, TX (US)

(72) Inventors: Thomas Edward Markusic, Georgetown, TX (US); Anatoli Alimpievich Borissov, Sugar Land, TX (US)

(73) Assignee: FIREFLY AEROSPACE INC., Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/740,958

(22) Filed: May 10, 2022

(65) Prior Publication Data

US 2022/0268239 A1    Aug. 25, 2022

Related U.S. Application Data

(63) Continuation of application No. 17/324,000, filed on May 18, 2021, now Pat. No. 11,384,713, which is a
(Continued)

(51) Int. Cl.
*F02K 9/48* (2006.01)
*F02K 9/62* (2006.01)
(Continued)

(52) U.S. Cl.
CPC .............. *F02K 9/48* (2013.01); *B64G 1/401* (2013.01); *F02K 9/42* (2013.01); *F02K 9/44* (2013.01);
(Continued)

(58) Field of Classification Search
CPC ...... F02K 9/42; F02K 9/44; F02K 9/46; F02K 9/48; F02K 9/62; F02K 9/64; B64G 1/401
See application file for complete search history.

(56) References Cited

U.S. PATENT DOCUMENTS 2,531,761 A    11/1950  Zucrow
2,558,483 A     6/1951  Goddard
(Continued)

FOREIGN PATENT DOCUMENTS

DE     1197689 B       7/1965
DE    10054333 A1      5/2002
(Continued)

OTHER PUBLICATIONS

Borissov, A., "Our Wavy Cooking Channels Design Also Confirmed by Artificial Intelligent," Adrian Bejan & Constructal Law, Mar. 9, 2022, 3 pages.
(Continued)

*Primary Examiner* — Todd E Manahan
*Assistant Examiner* — Kyle Robert Thomas
(74) *Attorney, Agent, or Firm* — Zagorin Cave LLP; Robert W. Holland

(57) ABSTRACT

A liquid rocket engine integrates tap-off openings at a combustion chamber wall to direct exhaust from the combustion chamber to a tap-off manifold that provides the exhaust to one or more auxiliary systems, such as a turbopump that pumps oxygen and/or fuel into the combustion chamber. The tap-off opening passes through a fuel channel formed in that combustion chamber exterior wall and receives fuel through a fuel opening that interfaces the fuel channel and tap-off opening. The tap-off manifold nests within a fuel manifold for thermal management. The fuel channel directs fuel into the combustion chamber through
(Continued)

fuel port openings formed in the combustion chamber, the fuel port openings located closer to a headend of the combustion chamber than the tap-off openings.

6 Claims, 11 Drawing Sheets

Related U.S. Application Data continuation of application No. 16/584,449, filed on Sep. 26, 2019, now Pat. No. 11,008,977.

(51) Int. Cl.
- *F02K 9/52* (2006.01)
- *B64G 1/40* (2006.01)
- *F02K 9/64* (2006.01)
- *F02K 9/44* (2006.01)
- *F02K 9/46* (2006.01)
- *F02K 9/42* (2006.01)

(52) U.S. Cl.
CPC ............... *F02K 9/46* (2013.01); *F02K 9/52* (2013.01); *F02K 9/62* (2013.01); *F02K 9/64* (2013.01)

(56) References Cited

U.S. PATENT DOCUMENTS

| | | | |
|---|---|---|---|
| 2,558,484 A | 6/1951 | Goddard | |
| 2,659,195 A | 11/1953 | Mirko | |
| 2,749,706 A * | 6/1956 | Goddard | F02K 9/64 60/39.461 |
| 3,035,333 A | 1/1959 | Baer | |
| 2,880,577 A | 4/1959 | Leonard | |
| 2,977,754 A | 4/1961 | Bell, Jr. | |
| 3,043,103 A | 7/1962 | Dent et al. | |
| 3,127,737 A | 4/1964 | Ledwith | |
| 3,127,738 A | 4/1964 | Augustus et al. | |
| 3,134,224 A | 5/1964 | Lippincott et al. | |
| 3,161,378 A | 12/1964 | Frederick et al. | |
| 3,176,464 A | 4/1965 | Meyer | |
| 3,188,203 A | 6/1965 | Peaslee | |
| 3,413,810 A | 3/1968 | Kaufmann | |
| 3,695,515 A | 10/1972 | Stockel | |
| 3,699,772 A | 10/1972 | Elverum, Jr. | |
| 3,710,574 A | 1/1973 | Pearson | |
| 3,740,003 A * | 6/1973 | Ayre | F02K 9/82 60/229 |
| 3,768,256 A | 10/1973 | Butter | |
| 4,156,306 A | 5/1979 | Seidel et al. | |
| 4,430,977 A * | 2/1984 | Shimada | F02M 55/00 123/449 |
| 4,485,866 A | 12/1984 | Hemmerich et al. | |
| 4,707,225 A | 11/1987 | Schuler | |
| 5,014,508 A | 5/1991 | Lifka | |
| 5,172,548 A * | 12/1992 | Dubedout | F02K 9/52 60/265 |
| 5,249,357 A | 10/1993 | Holmes et al. | |
| 5,622,046 A | 4/1997 | Michaels et al. | |
| 6,688,100 B1 | 2/2004 | Wherley et al. | |
| 6,783,824 B2 | 8/2004 | Steffier | |
| 6,829,884 B2 | 12/2004 | Fint et al. | |
| 6,860,099 B1 | 3/2005 | Xenofos et al. | |
| 7,343,732 B2 | 3/2008 | Hewitt | |
| 7,503,511 B2 | 3/2009 | Mueller | |
| 7,603,843 B2 | 10/2009 | Froehlich | |
| 8,292,217 B2 | 10/2012 | Smith | |
| 9,249,758 B2 | 2/2016 | Conrardy | |
| 9,650,958 B2 | 5/2017 | DiCintio et al. | |
| 9,835,114 B1 | 12/2017 | Gradl et al. | |
| 10,907,905 B2 | 2/2021 | Masgrau | |
| 10,927,793 B2 | 2/2021 | Gabaldo | |
| 2006/0144959 A1 | 7/2006 | Hewitt | |
| 2008/0121548 A1 | 5/2008 | Yousefiani | |
| 2013/0219719 A1 | 8/2013 | Sisk | |
| 2014/0325958 A1 | 11/2014 | Conrardy | |
| 2015/0308384 A1 * | 10/2015 | Barthoulot | F02K 9/50 60/260 |
| 2018/0010552 A1 | 1/2018 | Brummer | |
| 2018/0119644 A1 | 5/2018 | Gabaldo et al. | |

FOREIGN PATENT DOCUMENTS

| | | |
|---|---|---|
| DE | 10156124 A1 | 6/2003 |
| GB | 2190964 A | 12/1987 |
| WO | 1999004156 A1 | 1/1999 |
| WO | 2002055864 A1 | 7/2002 |

OTHER PUBLICATIONS

Orr, G.J., XCompute: Advanced Systems for Complex Science & Engineering, Apr. 19, 2018, 47 pages.
Pillow, C.E., Altitude Developmental Testing of the J-2S Rocket Engine in Rocket Development Test Cell (J-4) (Tests J4-1001-06, -07, -11, and -15), Sep. 1970, 118 pages.
Sutton, G. and Biblarz, O., "Rocket Propulsion Elements" Eighth Edition, 2010, 8 pages.
Sutton, G. and Biblarz, O., "Rocket Propulsion Elements" Seventh Edition, 2001, 764 pages.
Wikipedia, "Air-Augmented Rocket," downloaded from https://en.wikipedia.org/wiki/Air-augmented_rocket on Apr. 24, 2020, 5 pages.
Wikipedia, "Ramjet," downloaded from https://en.wikipedia.org/wiki/Ramjet on Apr. 24, 2020, 15 pages.
Sui, Y., et al., "Fluid Flow and Heat Transfer in Wavy Microchannels," International Journal of Heat and Mass Transfer 53, Mar. 19, 2010, pp. 2760-2772.
Urade, A., et al., "Review on Heat Transfer Enhancement Using the Wavy Fin," International Engineering Research Journal (IERJ), Special Issue, Nov. 4, 2015, pp. 49-53.

* cited by examiner

LIQUID ROCKET ENGINE TAP-OFF POWER SOURCE

CROSS-REFERENCE TO RELATED APPLICATIONS

This application is a continuation of U.S. patent application Ser. No. 17/324,000, filed May 18, 2021, entitled "Liquid Rocket Engine Tap-Off Power Source," naming Thomas Edward Markusic and Anatoli Alimpievich Borissov as inventors, which application is a continuation of Ser. No. 16/584,449, filed Sep. 26, 2019, now U.S. Pat. No. 11,008,977, issued May 18, 2021, entitled "Liquid Rocket Engine Tap-Off Power Source," naming Thomas Edward Markusic and Anatoli Alimpievich Borissov as inventors, which applications are incorporated herein by reference in its entirety.

BACKGROUND OF THE INVENTION

Field of the Invention

The present invention relates in general to the field of liquid rocket engines, and more particularly to a liquid rocket engine with tap-off power source.

Description of the Related Art

Liquid rocket engines generate thrust by burning propellant, such as fuel mixed with liquid oxygen, in a combustion chamber at extremely high temperatures and pressures, and exhausting the combustion gases through a throat and out a nozzle to produce a supersonic airflow. Generally, rockets launch payloads, such as satellites, into orbit by generating thrust in excess of the weight of the rocket, fuel and oxygen stored onboard the rocket and the payload. By minimizing rocket structural weight and maximizing efficient use of propellant, payload weight improves for a desired orbit. Firefly Aerospace Inc. has invented a cross-impinged propellant injection and a cooling channel arrangement that improve payload, as described in the following two patent applications, which are incorporated herein as though fully set forth: "Liquid Rocket Engine Cooling Channels," U.S. patent application Ser. No. 16/256,210, and "Liquid Rocket Engine Cross Impinged Propellant Injection," U.S. patent application Ser. No. 16/256,206, both by Anatoli Alimpievich Borissov and Thomas Edward Markusic, the inventors hereof.

To provide fuel and oxygen flow to the combustion chamber with adequate pressure, liquid rocket engines typically have a turbopump that feeds fuel to a fuel manifold and oxygen to an oxygen manifold. As described above, the fuel generally passes through cooling channels formed in the liquid rocket engine thruster body to help manage thruster body thermal constraints through regenerative absorption of excess thermal energy. The turbopump is typically powered by a small liquid rocket engine, also known as a gas-generator, which exhausts into the turbopump turbine blades to generate power that pressurizes fuel and oxygen. The use of a separate small liquid rocket engine to power the turbopump introduces a number of difficulties and complexities. For example, the separate liquid rocket engine adds weight to the rocket and consumes fuel that might otherwise lift the payload. The added weight typically includes a system of hydraulic valves used to manage propellants consumed by the small liquid rocket engine. The hydraulic valves also increase system cost and complexity while offering many additional potential failure instances, such as where turbopump pressure drops resulting in insufficient cooling of the thruster body and catastrophic failure of the rocket. Another difficulty that arises with use of a small liquid rocket engine is that the exhaust that feeds into the turbopump tends to have a fairly high level of soot, which impacts turbopump efficiency and lifespan.

Another option available to power the turbopump is to tap combustion gases at the combustion chamber to feed to the turbopump. Such so called "tap-off" systems were researched and tested in the 1960 era with minimal success. Although these early tap-off systems avoided the expense and complexity of hydraulic valves to manage a gas generator, the difficulties associated with routing combustion gases from the combustion chamber to the turbopump proved too substantial to permit a flight version. For example, tap-off gas conditions, such as pressure, temperature and gas composition, have to be managed within operating constraints of the turbopump throughout the flight envelope. The more expensive and complex gas generators became the only practical alternative for commercial rocket flight.

SUMMARY OF THE INVENTION

Therefore, a need has arisen for a system and method which taps combustion chamber energy to power liquid rocket engine auxiliary systems.

In accordance with the present invention, a new system and method are provided which substantially reduce the disadvantages and problems associated with previous methods and systems that tap combustion chamber energy to power liquid rocket engine auxiliary systems, such as turbopump that provides fuel and oxygen to the liquid rocket engine under pressure. Tap-off openings, formed in a combustion chamber wall, feed combustion gases to a tap-off manifold nested within a fuel manifold and interfaced as a power source with auxiliary systems, such as a turbopump. The tap-off openings pass through a cooling fin that is disposed at the combustion chamber exterior in a fuel channel and that includes an opening from the fuel channel to the tap-off opening for fuel injection into the tap-off combustion gases. Both a toroidal vortex formed in the combustion chamber by oxygen and fuel injection and a relative location of fuel injection port openings to the tap-off openings provide an oxygen rich tap-off flow to efficiently burn fuel injected at the tap-off opening within the tap-off manifold.

More specifically, a liquid rocket engine thruster body generates thrust by burning fuel and oxygen injected into a combustion chamber to create a supersonic flow out a throat and nozzle from the combustion chamber. A turbopump pumps fuel and liquid oxygen under high pressure into the combustion chamber with power provided by a tap-off manifold that receives tap-off gases from the thruster body combustion chamber. Tap-off gases pass from the combustion chamber to the tap-off manifold through tap-off openings cooled by fuel in fuel channels integrated in the thruster body. For instance, tap-off openings are drilled through a cooling fin formed in the fuel channel and interface with fuel disposed in the fuel channel through a tap-off fuel injection opening that adds fuel to the tap-off gases as the tap-off gases proceed through the tap-off opening. A cross-fire propellant injection system of the combustion chamber generates an oxygen rich tap-off gas flow for tap-off openings located below fuel injection openings relative to the combustion chamber headend. The oxygen rich tap-off gases mix with injected fuel and burn in a flameless mode that generates an optimal soot-free exhaust to feed the turbopump. The tap-off manifold nests within a fuel manifold to maintain the tap-off manifold within thermal constraints by transferring excess thermal energy to fuel in the fuel manifold. Fuel guides formed in the outer surface of the tap-off manifold enhance thermal exchange and guide fuel to fuel channels formed in the thruster body.

The present invention provides a number of important technical advantages. One example of an important technical advantage is that a liquid rocket engine has auxiliary systems, such as a turbopump that pressurizes fuel and oxygen, powered by combustion chamber gases instead of a separate gas generator. Tap-off power supplied to auxiliary systems reduces rocket structural weight by eliminating the separate gas generator and removes a layer of complexity by eliminating hydraulic valves associated with the separate gas generator. As a result, manufacture costs are reduced and liquid rocket engine reliability is increased. By locating tap-off openings proximate to fuel port openings, combustion chamber gases enter the tap-off openings with a heated and oxygen-rich mixture that cleanly burns additional injected fuel in a volume distributed (flameless) mode that produces a better gas feed for the turbopump with reduced soot content. Metallic structures of the tap-off opening and manifold are protected from thermal damage with regenerative thermal transfer to fuel of the fuel channels and the fuel manifold in which the tap-off manifold is nested.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A liquid rocket engine generates thrust with a more simple and reliable tap-off auxiliary power supply. Heated gases generated in a combustion chamber are tapped through tap-off openings formed in the combustion chamber wall and redirected through a tap-off manifold to a turbopump that applies the heated gases to drive fuel and oxygen pumps that feed the combustion chamber. Tap-off thermal management is provided through a highly developed external heat transfer surface by nesting the tap-off manifold within the fuel manifold so that the tap-off manifold is regeneratively cooled by fuel flowing from the fuel source towards thruster body fuel channels. Within a combustion chamber having fuel injected from fuel port openings formed at cooling channels integrated in a side wall to impinge against oxygen injected at a headend towards the side wall, a toroidal vortex forms that allows an oxygen rich gas mixture to be drawn where the fuel port openings are disposed closer to the headend than the tap-off openings. Fuel injection from the cooling channels into the tap-off opening evaporates to further cool the tap-off gases and then mixes with the oxygen-rich tap-off gases through axial flow encouraged by the tap-off manifold for volume distributed (flameless) burning with the resulting gas having a near-ideal composition for turbopump intake with minimal soot. Reliable and efficient auxiliary power supply is provided to the turbopump with the tap-off manifold safely sealed at the combustion chamber to prevent leakage under high working fuel pressure.

Figure 1:
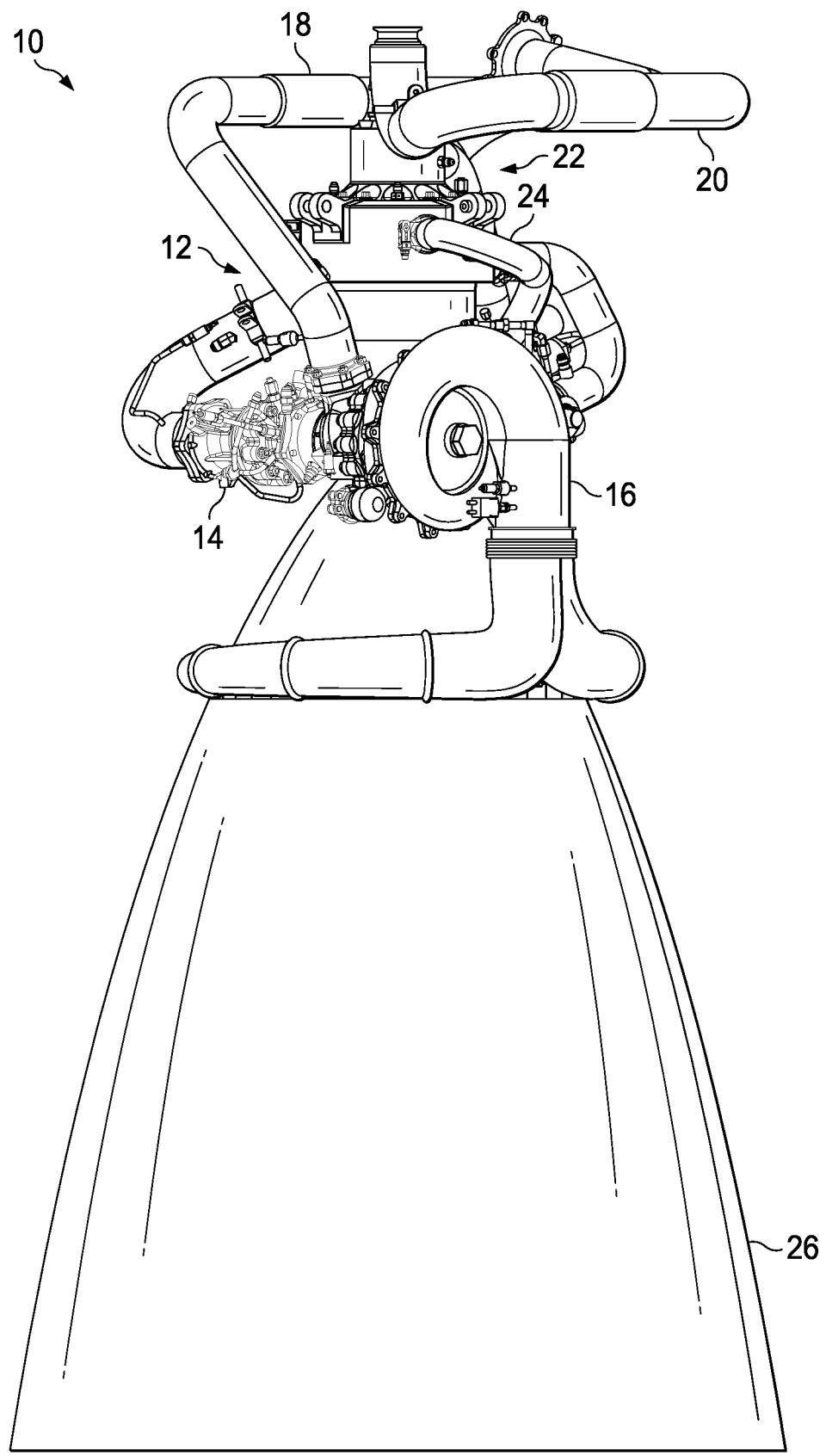
FIG. 1 depicts a side view of a liquid rocket engine configured to power a turbopump with heated gases provided from the liquid rocket engine's combustion chamber through a tap-off supply.

Referring now to FIG. 1, a side view depicts a liquid rocket engine 10 configured to power a turbopump 14 with heated gases provided from the liquid rocket engine's combustion chamber through a tap-off supply 12. Liquid rocket engine 10 generates thrust by forcing oxygen and fuel with turbopump 14 from a liquid oxygen supply 18 and a fuel supply 20 into a combustion chamber for burning. For instance, liquid rocket engine 10 is built into a rocket that houses a liquid oxygen tank interfaced with liquid oxygen supply 18 and a fuel tank interfaced with fuel supply 20. Turbopump 14 pumps oxygen provided from liquid oxygen supply 18 to a liquid oxygen feed 22 that interfaces with an oxygen manifold, and pumps fuel provided from fuel supply 20 to a fuel feed 24 that interfaces with a fuel manifold. Fuel and oxygen pumped into liquid rocket engine 10 burn to generate combustion gases having high temperatures and pressures that are forced through a throat and out a nozzle 26, which converts the internal energy of the combustion gases to a kinetic energy of supersonic flow. Turbopump 14 exhausts tap-off gases at a tap-off exhaust 16 that feeds into nozzle 26 at the sonic flow. The energy of this flow translates to thrust applied by liquid rocket engine 10 to the rocket in which it is coupled.

Figure 2:
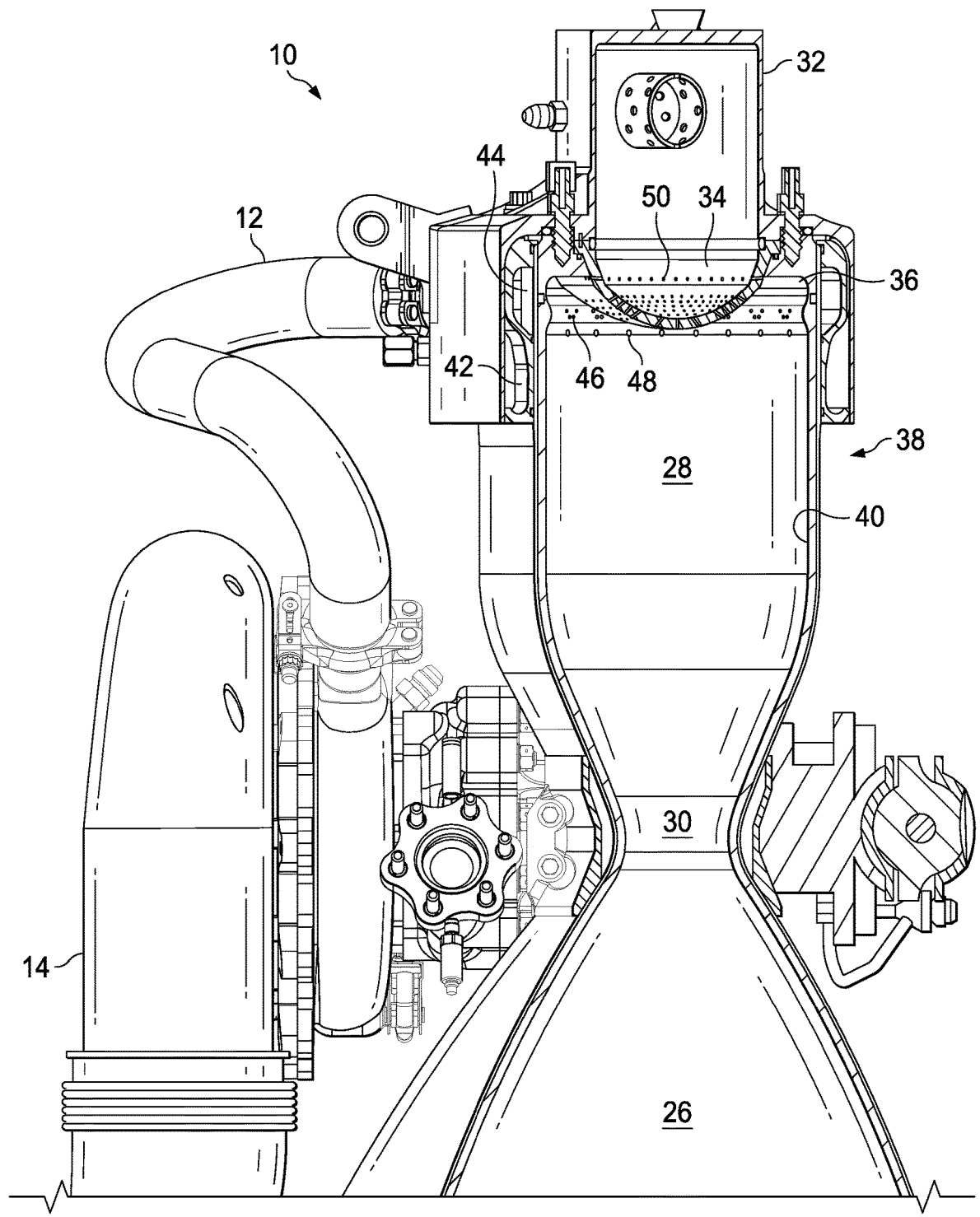
FIG. 2 depicts a side cutaway view of the liquid rocket engine configured to tap-off combustion chamber gases formed with a toroidal vortex flow of cross impinged fuel port openings in a side combustion chamber wall and an oxygen injector centrally located at the combustion chamber headend.

Referring now to FIG. 2, a side cutaway view depicts liquid rocket engine 10 configured to tap-off combustion chamber 28 gases formed with a toroidal vortex flow of cross impinged fuel port openings 46 in a side combustion chamber wall 40 and an oxygen injector 34 centrally located at the combustion chamber 28 headend 36. In the example embodiment, thruster body 38 forms a combustion chamber 28 terminated at a headend 36 to force high temperature and pressure exhaust gases through a throat 30 and out a nozzle 26, thus generating a supersonic exhaust flow. An oxygen manifold 32 located above headend 36 of thruster body 38 receives liquid oxygen from turbopump 14 at high pressure to force the liquid oxygen into oxygen injector 34 for injection through oxygen port openings 50 into combustion chamber 28. Similarly, a fuel manifold 42 located exterior to combustion chamber wall 40 below headend 36 of thruster body 38 receives fuel, such as kerosene, from turbopump 14 at high pressure to force the fuel through fuel port openings 46 formed through combustion chamber wall 40. As is set forth below and in the incorporated patent applications in greater detail, fuel provided to fuel manifold 44 is forced through fuel channels integrated within combustion chamber wall 40 to provide regenerative cooling to thruster body 38 before injection into combustion chamber 28. Tap-off openings 48 formed in combustion chamber wall 40 provide a pathway for heated combustion gases from combustion chamber 28 into tap-off manifold 44 from which the combustion gases exit to tap-off supply 12 as a power source for turbopump 14. In the example embodiment, fuel port openings 46 are symmetrically disposed about the inner surface circumference of combustion chamber wall 40 above symmetrically disposed tap-off openings 48 relative to headend 36. As is set forth below, the toroidal vortex generated by impingement of fuel and oxygen injection within combustion chamber 28 results in an oxygen rich gas content at tap-off openings 48.

Figure 3:
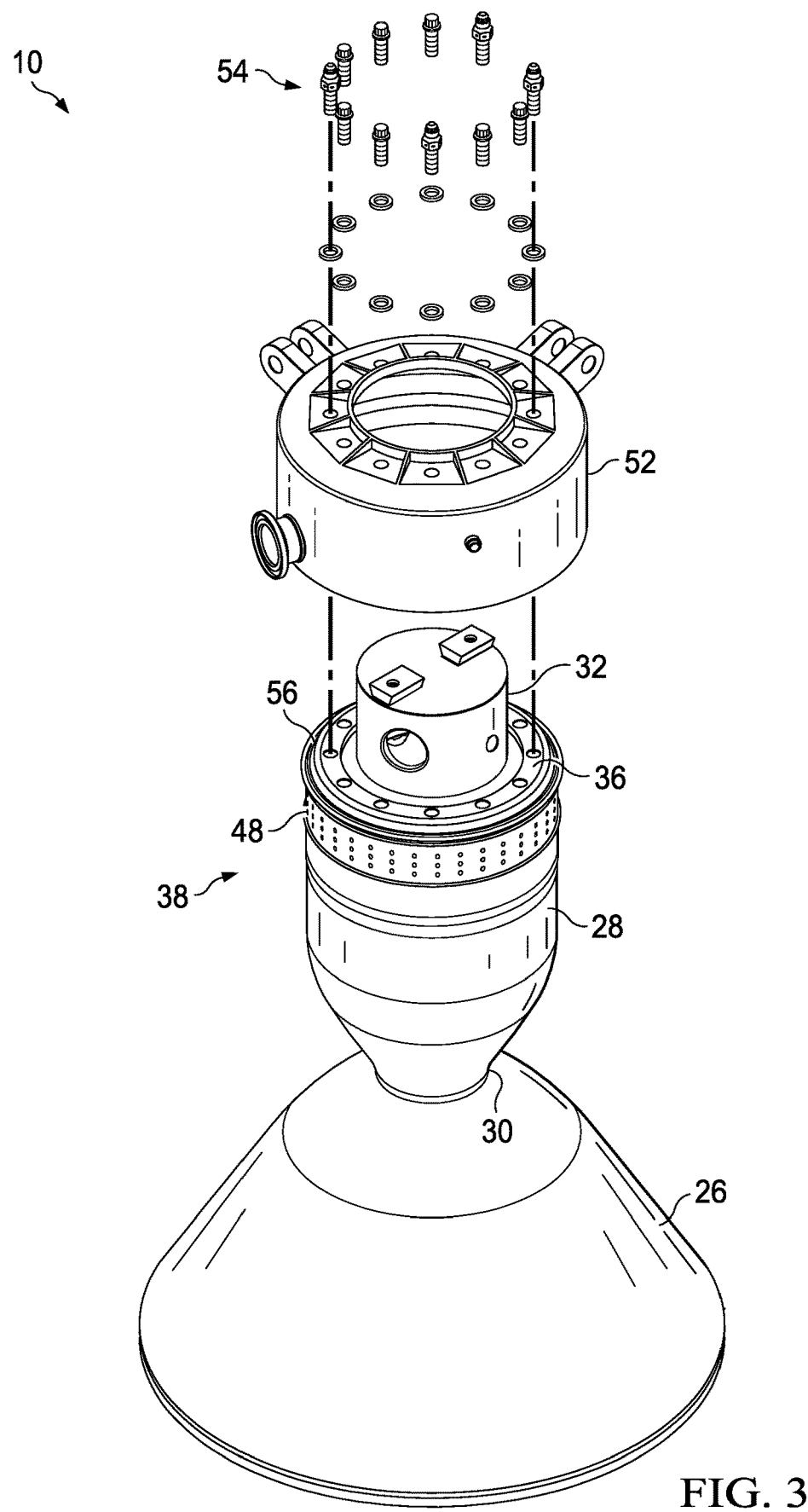
FIG. 3 depicts a side perspective exploded view of alignment of a nested manifold assembly at the headend of the thruster body.

Referring now to FIG. 3, a side perspective exploded view depicts alignment of a nested manifold assembly 52 at headend 36 of thruster body 38. Nested manifold assembly 52 has a central opening that fits around oxygen manifold 32 and couples to headend 36 with couplers 54, such as bolts that engage threads formed in headend 36. Nested manifold assembly 52 fits around the upper circumference of thruster body 38 to expose tap-off openings 48 drilled through into combustion chamber 28 to a cavity formed within tap-off manifold 44 that integrates in nested manifold assembly 52. At the upper circumference of thruster body 38 at headend 36, fuel guides 56 are exposed that guide fuel into fuel channels integrated in thruster body 38. Fuel manifold 42 integrated in nested manifold assembly 52 is exposed to fuel guides 56 at the inner circumference of nested manifold assembly 52 above tap-off manifold 44 so that fuel from fuel manifold 42 flows through fuel guides 56 and into fuel channels integrated in thruster body 38. Nested manifold assembly 52 not only ensures a tight seal of tap-off manifold 44 but provides cooling around the entire circumference of tap-off manifold 44 by flowing fuel into a fuel manifold cavity below tap-off manifold 44 and over top of tap-off manifold 44 into fuel guides 56.

Figure 4:
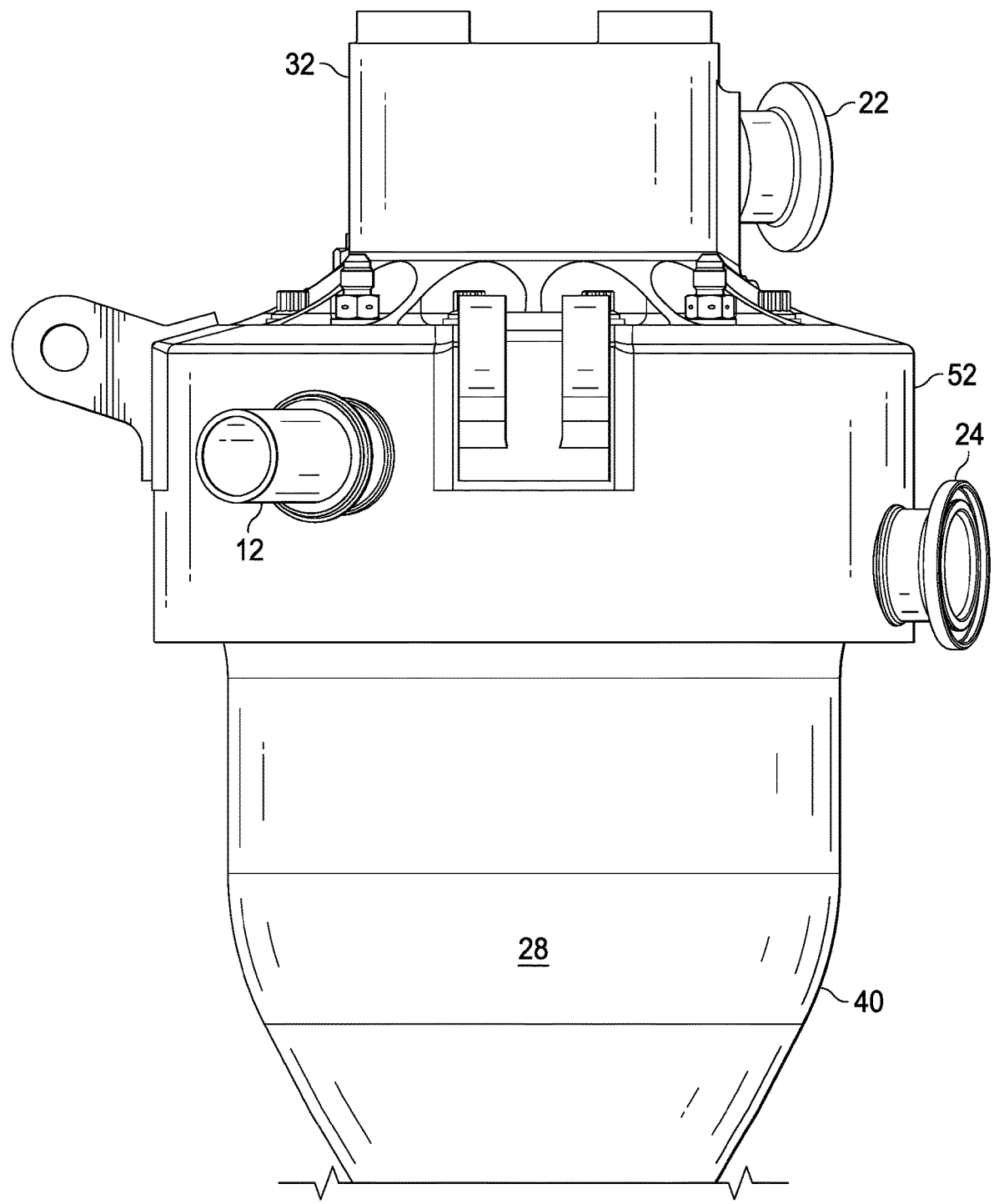
FIG. 4 depicts a side view of an example arrangement of fuel and oxygen feeds into a nested manifold assembly and tap-off supply out of the nested manifold assembly.

Referring now to FIG. 4, a side view depicts an example arrangement of fuel and oxygen feeds into nested manifold assembly 52 and tap-off supply out of nested manifold assembly 52. Nested manifold assembly 52 fits over headend 36 at the upper portions of combustion chamber 28 for a simple manufacture process that provides a tight seal between fuel, oxygen and tap-off gases. Oxygen feed 22 provides oxygen to oxygen manifold 32 at a top central location of combustion chamber 28 with clear separation from fuel feed 24 at a side of nested manifold assembly 52. Fuel enters fuel feed 24 into a cavity of a fuel manifold within nested manifold assembly 52 below a tap-off manifold within nested manifold assembly 52 so that the tap-off manifold is surrounded by fuel for thermal exchange. Tap-off supply 12 provides a feed of heated tap-off gases to feed turbopump 14.

Figure 5:
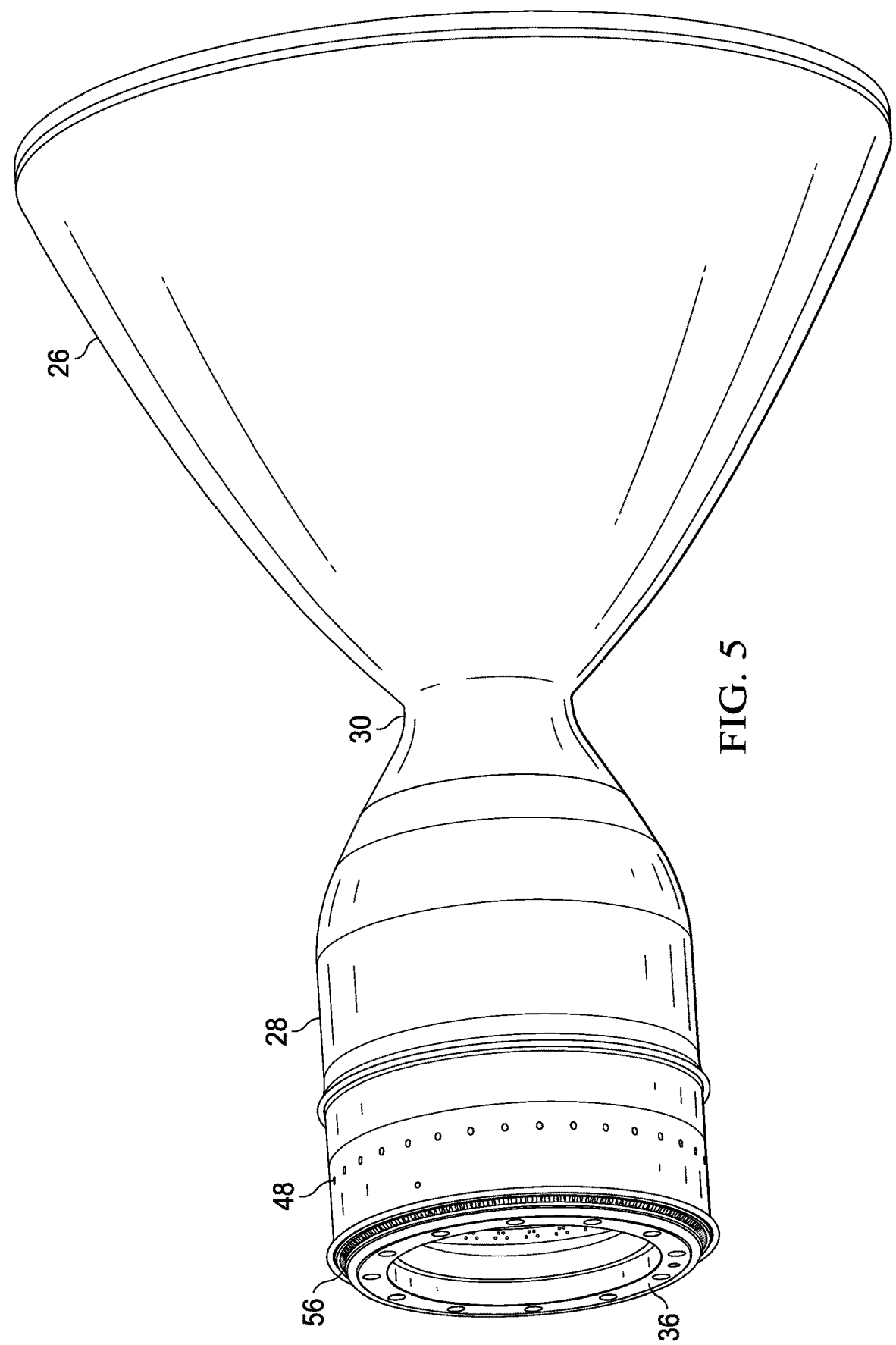
FIG. 5 depicts an upper side perspective view of the thruster body with the nested manifold removed.

Referring now to FIG. 5, an upper side perspective view depicts thruster body 38 with nested manifold assembly 52 removed. The upper view illustrates how the example embodiment readily assembles yet maintains separation of oxygen, fuel and tap-off gases during operation. Headend 36 defines a barrier at coupling of oxygen manifold 32 that separates cooling fuel flow into fuel guides 56 from the interior of combustion chamber 28. Nested manifold assembly 52 assembles over headend 36 so that fuel guides 56 align with fuel guides within the fuel manifold to direct fuel into fuel channels integrated in combustion chamber 28. Tap-off openings 48 communicate a tap-off manifold cavity with combustion chamber 28 down and away from fuel guides 56 to provide separation between fuel feeding into fuel channels and tap-off gases exiting combustion chamber 28 through tap-off openings 48.

Figure 6:
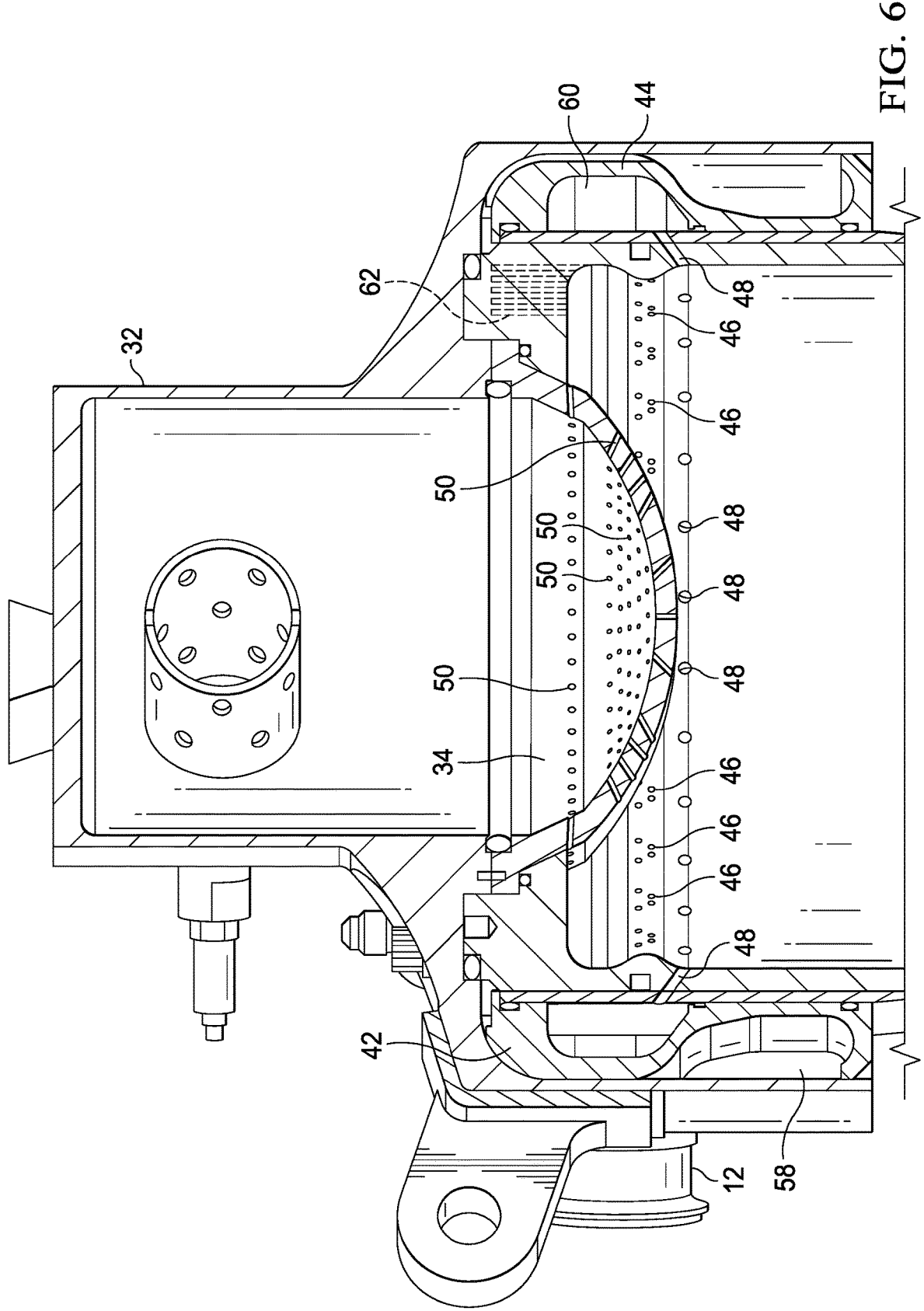
FIG. 6 depicts a side cutaway view of the thruster body that illustrates the relationship between oxygen, fuel and tap-off openings within the combustion chamber.

Referring now to FIG. 6, a side cutaway view of thruster body 38 illustrates the relationship between oxygen, fuel and tap-off openings within combustion chamber 28. As is explained in depth in the incorporated patent applications, oxygen port openings 50 and fuel port openings 46 align to generate fuel and oxygen flows that impinge against each other, thus creating a toroidal vortex that mixes oxygen and fuel for more efficient burning away from thruster body 38 inner surfaces. The top row of oxygen port openings 50 proximate the headend provide about thirty percent (30%) of oxygen to create a strong near wall jet of oxygen. The jet provides cooling of the headend and lateral walls of the combustion chamber and help to form the vortex flow. The oxygen concentration is enriched on the outer boundary of the vortex (near the wall of the combustion chamber) due to the elevated amount of oxygen injected from the top set of oxygen ports. A cutaway of combustion chamber 28 inner surface above fuel port openings 46 illustrates fuel channels 62 integrated in thruster body 38 that accept fuel from fuel guides 56 to route the fuel through thruster body 38 for regenerative cooling. Tap-off openings 48 are located below fuel port openings 46 relative to headend 36 so that the toroidal vortex flow within combustion chamber 28 will induce a heated and oxygen-rich combustion chamber gas content into tap-off openings 48. Each tap-off opening 48 feeds combustion chamber gases through thruster body 38 and into a tap-off manifold cavity 60 defined within tap-off manifold 44. As is set forth in greater detail below, tap-off opening 48 is formed through a cooling fin structure within fuel channels 62 to provide cooling to the metal that defines the tap-off openings 48. Tap-off openings 48 are essentially drilled completely through combustion chamber 28 from the interior surface to the exterior surface where tap-off manifold cavity 60 accepts the heated gases. In contrast, fuel port openings 46 provide flow of fuel from fuel channels 62 into combustion chamber 28 and are thus drilled from only the interior surface of combustion chamber 28 into the fuel channel 62.

In the example embodiment of FIG. 6, fuel manifold 42 defines a fuel manifold cavity 58 around tap-off manifold 44 that provides thermal transfer from tap-off manifold 44 into fuel as the fuel enters fuel manifold cavity 58 at its lower portion and proceeds over top of tap-off manifold 44 to enter into fuel channels 62. Tap-off manifold cavity 60 provides an axial flow of tap-off gases around the outer circumference of thruster body 38 to mix and burn oxygen and fuel as the tap-off gases proceed towards tap-off supply 12. In particular, since the oxygen rich composition provided from combustion chamber 28 through tap-off openings 48 to tap-off manifold 44 is heated (as opposed to the relatively cold flow of oxygen provided to a gas generator), a more gradual and efficient nearly flameless burning of additional fuel added to tap-off manifold 44 provides reduced soot in the exhaust that proceeds out tap-off supply 12 to turbopump 14.

Figure 7:
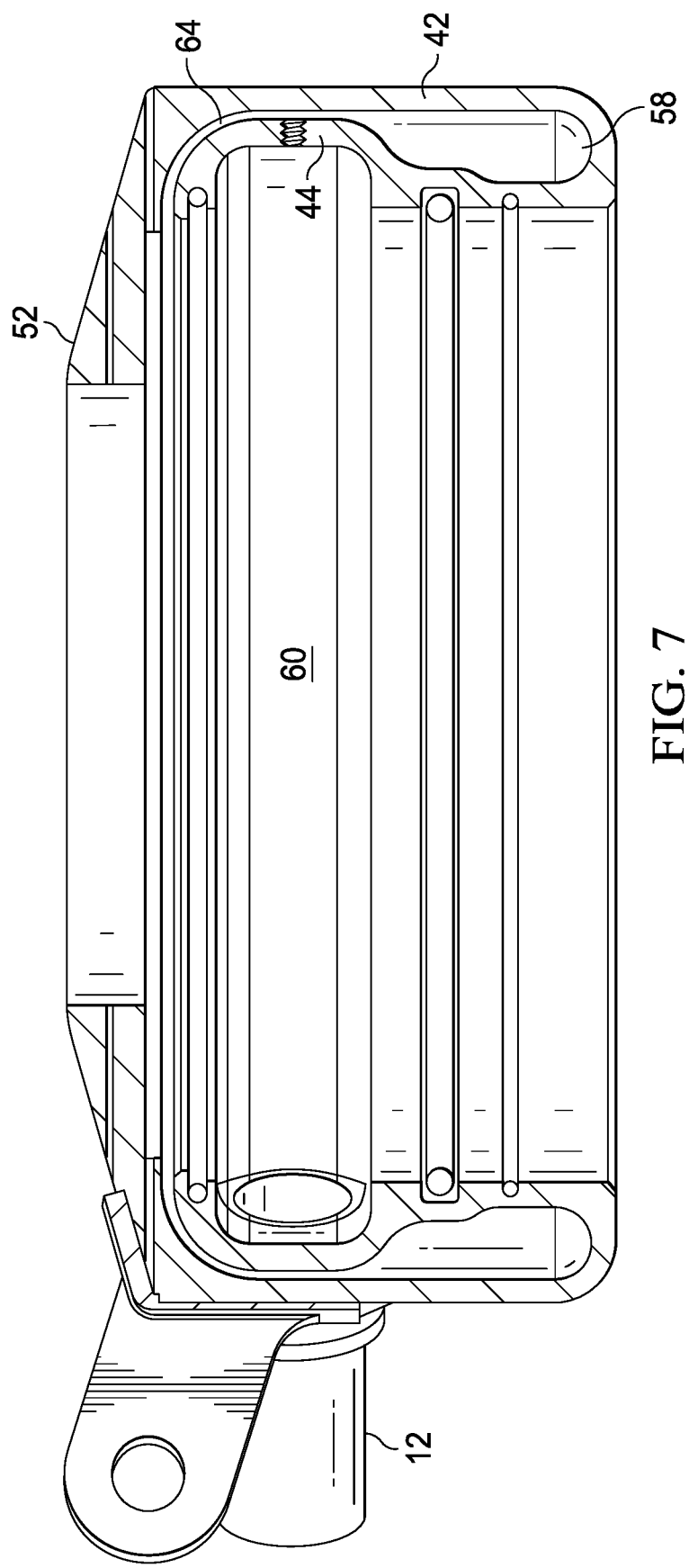
FIG. 7 depicts a side cutaway view of a nested manifold assembly with a fuel manifold encircling a tap-off manifold to provide thermal management by transfer of excess thermal energy from the tap-off manifold to fuel disposed within the fuel manifold cavity.

Referring now to FIG. 7, a side cutaway view depicts nested manifold assembly 52 with fuel manifold 42 encircling tap-off manifold 44 to provide thermal management by transfer of excess thermal energy from tap-off manifold 44 to fuel disposed within fuel manifold cavity 58. Fuel within fuel manifold cavity 58 is pumped under pressure through a fuel path 64 and into fuel channels integrated in thruster body 38. The fuel channels 62 pass proximate the interior circumference of tap-off manifold 44 so that thermal management by transfer of thermal energy to flowing fuel is provided about the entire exterior surface of tap-off manifold 60.

Figure 8:
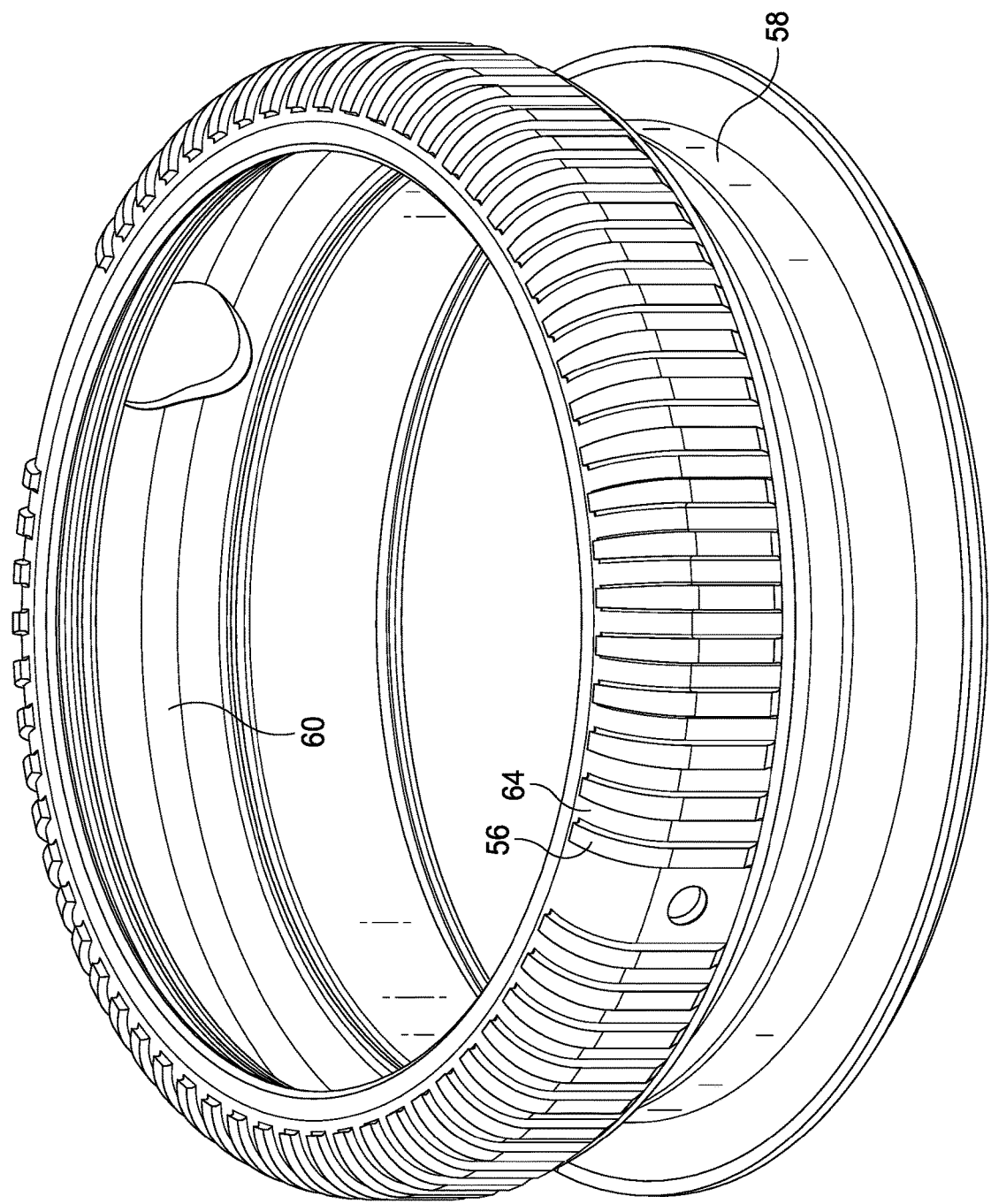
FIG. 8 depicts an upper side perspective view of a tap-off and fuel manifold inner portion before assembly into the nested manifold assembly.

Referring now to FIG. 8, an upper side perspective view depicts a tap-off and fuel manifold inner portion before assembly into a nested manifold assembly 52. Fuel guides 56 are machined into the outer surface of tap-off manifold cavity 60 to direct fuel from fuel manifold cavity 58 along a fuel path 64 to fuel guides of the thruster body that feed fuel channels 62. Machining tap-off manifold cavity 60 and fuel manifold cavity 58 on opposing sides of a contiguous metal piece provides strength of the structure and reduced risk of leakages.

Figure 9:
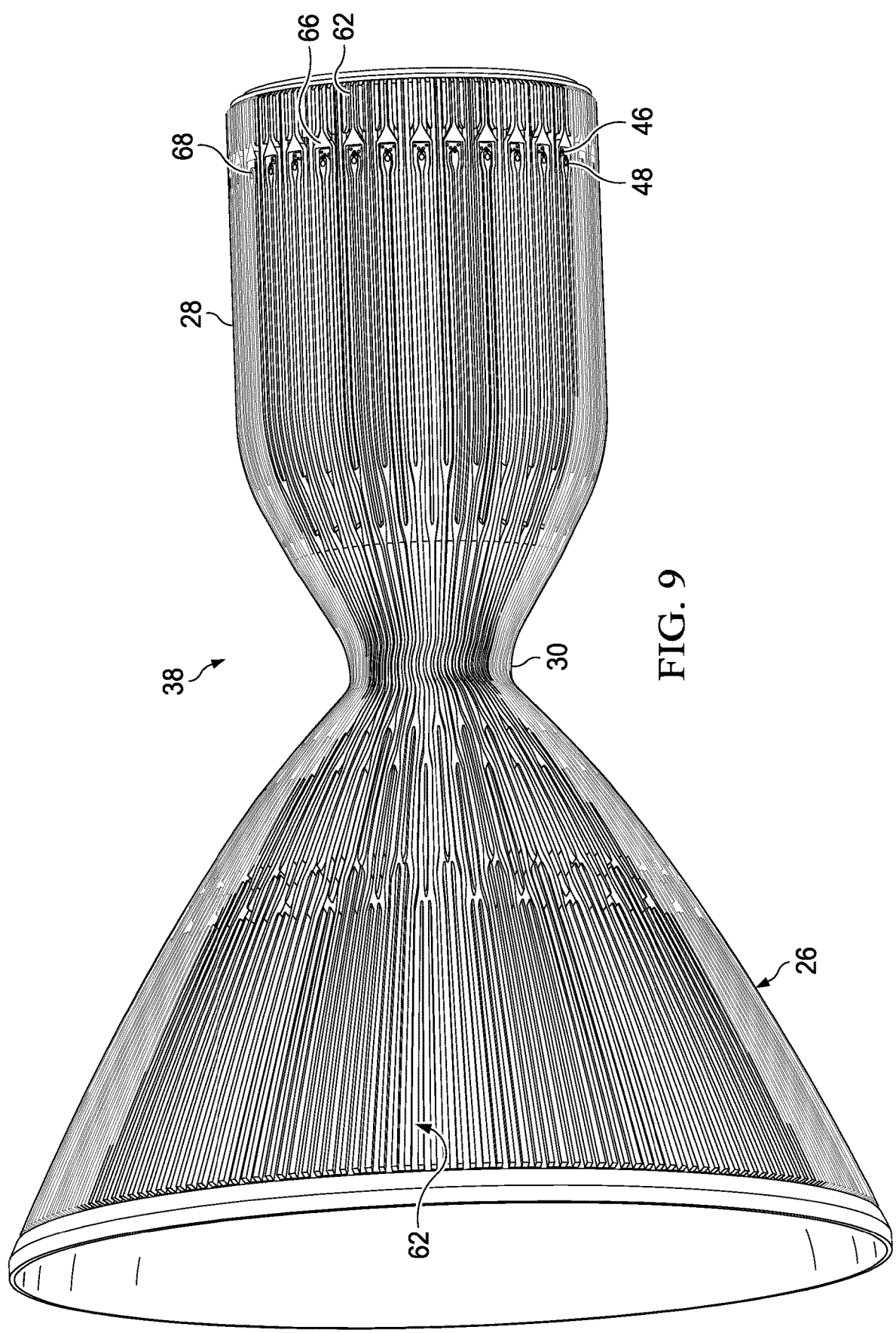
FIG. 9 depicts a side perspective view of thruster body fuel channels having the outer surface layer removed.

Referring now to FIG. 9, a side perspective view depicts thruster body 38 fuel channels 62 having the outer surface layer removed. The incorporated patents describe manufacture of thruster body 38 by machining fuel channels 62, filling the fuel channels 62 with wax and then depositing nickel over top to define enclosed fuel channels. The fuel channels 62 formed in thruster body 38 may be manufactured in a manner similar to that described by the incorporated patent applications. In addition to drilling fuel port openings 46 to provide a pathway for fuel injection from fuel channels 62 into combustion chamber 28, tap-off openings 48 are drilled to provide access of combustion gases to a tap-off manifold coupled external to thruster body 38. Thus, one difference in the manufacture of tap-off openings 48 from fuel port openings 46 is that the tap-off openings 48 pass completely through thruster body 38, whereas fuel port openings 46 only provide a pathway from fuel channels 62 into combustion chamber 28. To achieve an appropriate pathway for tap-off gas flow, a fuel guide structure 66 is included in fuel channels 62 that provide fuel to combustion chamber 28. Fuel flows from headend 36 of combustion chamber 28 through fuel channels 62 to the end of nozzle 26 and then return to where fuel guide structures 66 are formed for injection into combustion chamber 28 through fuel port openings 46.

Near fuel guide structure 66, a tap-off fin 68 is machined between two adjacent fuel channels 62 that bring fuel to fuel port openings 46. Tap-off openings 46 are drilled through the tap-off fin 68, which has a height that extends to where the outer surface of thruster body 38 is formed by nickel deposition. During plating, wax fills the tap-off opening 48 so that a through opening is left from the interior surface of combustion chamber 28 to the outer surface of combustion chamber 28. As is described in greater detail below, fuel guide structure 66 defines a flow path of fuel from adjacent fuel channels 62 around tap-off fin 68 for improved thermal transfer where combustion chamber 28 gases pass through tap-off opening 48.

Figure 10:
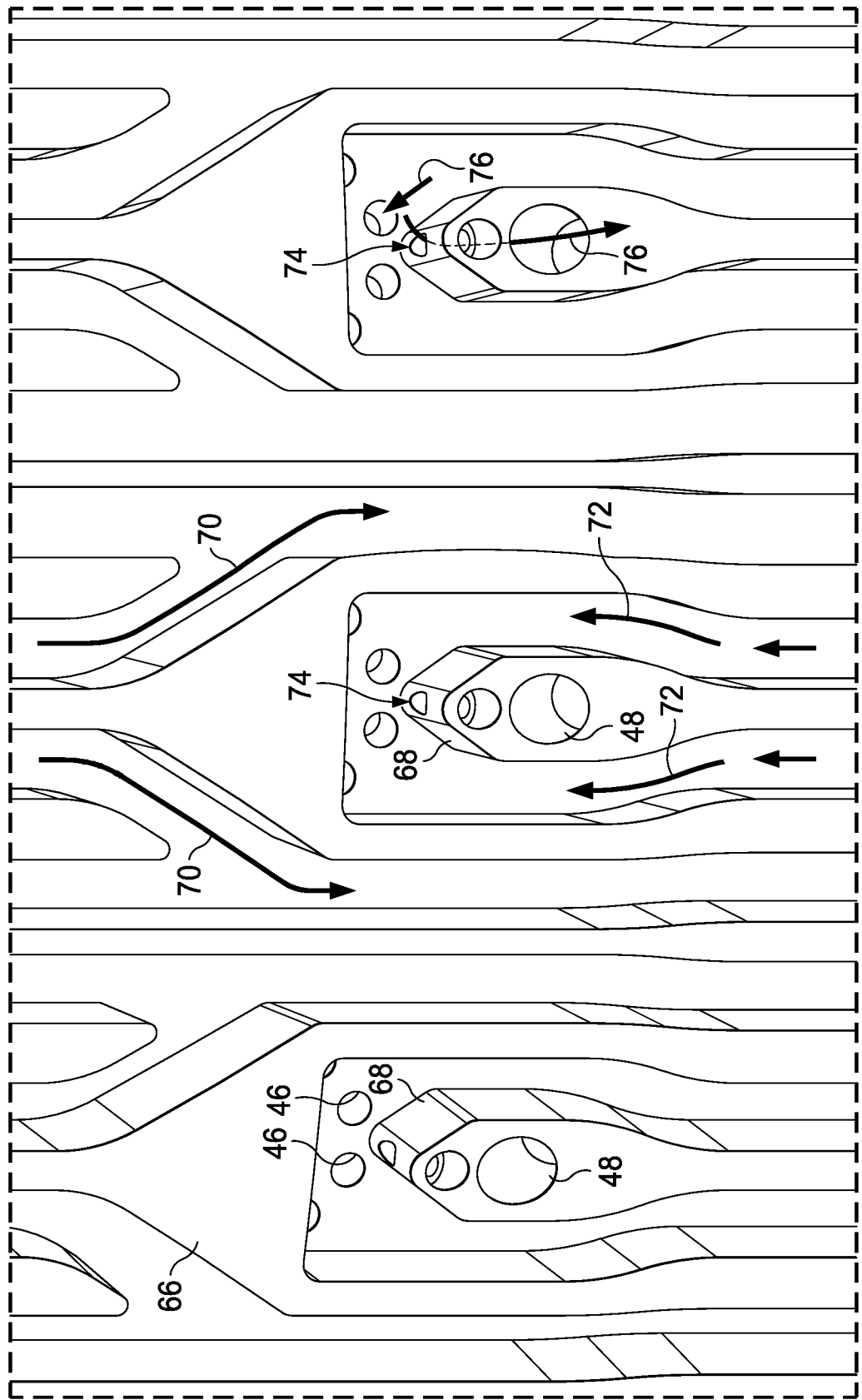
FIG. 10 depicts a close-up cut away view of fuel guides formed in the external surface of a combustion chamber that illustrates one example embodiment having tap-off openings drilled through tap-off fins.

Referring now to FIG. 10 a close-up cut away view of fuel guides 56 formed in the external surface of combustion chamber 28 illustrates one example embodiment having tap-off openings 48 drilled through tap-off fins 68. In the example embodiment, fuel guide structure 66 has a triangular shape that merges multiple fuel source paths 70 into two single paths traveling past where tap-off fin 68 is disposed within adjacent fuel injection paths 72. During operation, fuel enters into fuel source paths 70 at combustion chamber 28 headend 36 so that all fuel channels 62 from headend 36 to fuel guide structure 66 are carrying fuel in the same direction, i.e., towards nozzle 26. After fuel guide structure 66 forces merger of the fuel source paths 70, these paths proceed to nozzle 26 where their direction is reversed to become fuel injection paths 72. Once fuel travels along fuel injection path 72 to hit fuel guide structure 66, the fuel is forced out of fuel port openings 46 and injected into combustion chamber 28.

In the example embodiment, tap-off fin 68 is machined from thruster body 38 to create a structure that will support drilling of a tap-off opening 48 through it and also have surface area exposed to fuel injection path 72 that allows transfer of thermal energy from tap-off gases passing through tap-off opening 48 to fuel in fuel injection path 72. In addition, a tap-off opening fuel injection port 74 having an elliptical or oval shape provides a path for fuel in fuel injection path 72 to pass into tap-off opening 48. Injecting fuel into tap-off opening 48 and/or the tap-off manifold cavity helps to reduce tap-off gas temperature as the fuel evaporates and also adds fuel to the oxygen rich gas that enters tap-off opening 48 from combustion chamber 28. In various embodiments, fuel injects directly into the tap-off opening from an elliptical shaped opening at the fuel channel with an expanding circumference to aid atomization of the fuel. In one embodiment, at least some of the fuel injects towards a center location of the tap-off manifold to aid in mixing of the fuel with oxygen by the axial flow of tap-off gases around the tap-off manifold towards the tap-off source. In alternative embodiments, alternative configurations for fuel injection into tap-off opening 48 may be used. For example, tap-off openings 48 might be formed in a fuel source path 70 or have fuel injected from a fuel source path 70 to provide a greater thermal gradient. Similarly, the location of tap-off opening 48 might vary relative to fuel port openings 46 to achieve different fuel and oxygen mixture ratios. In the example embodiment, the use of an elliptical or oval shaped tap-off opening fuel injection port 74 aids in maintaining structural integrity at tap-off fin 68.

Figure 11:
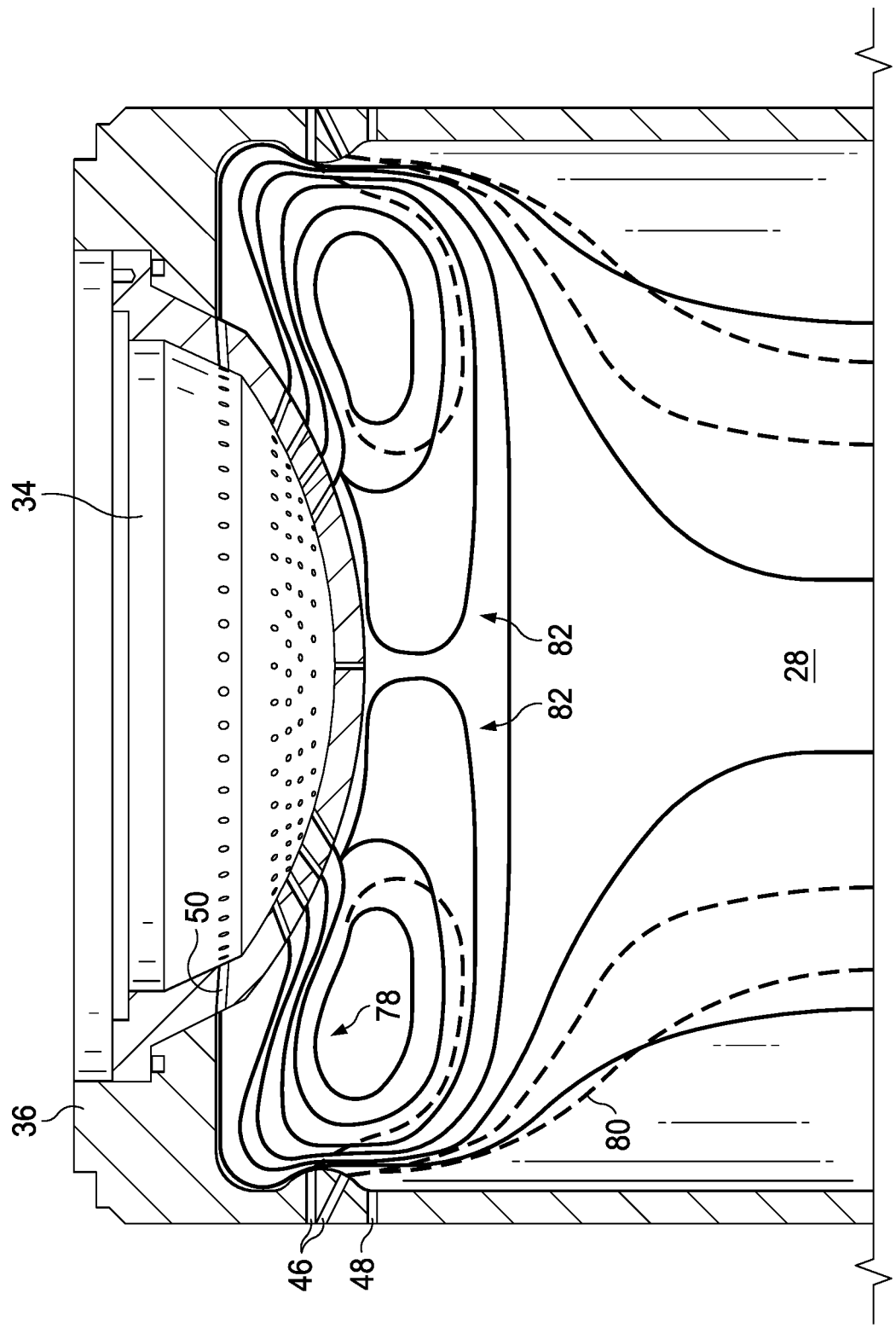
FIG. 11 depicts an example of a toroidal vortex formed by cross impingement of injected fuel and oxygen in a combustion chamber relative to tap-off openings.

Referring now to FIG. 11, an example depicts a toroidal vortex 82 formed by cross impingement of injected fuel flow 80 and oxygen 78 in combustion chamber 28 relative to tap-off openings 48. In the example embodiment, tap-off openings 48 are formed below fuel port openings 46 relative to headend 36 of combustion chamber 28. As is explained in greater detail in the incorporated patent applications, fuel flow 80 injected from fuel ports 46 towards a central location of combustion chamber 28 impinges oxygen flow 78 injected from oxygen port openings 50 to generate toroidal vortex 82, which mixes fuel and oxygen to burn away from combustion chamber 28 walls. In part, toroidal vortex 82 is encouraged by oxygen port openings 50 aligned to inject oxygen parallel to headend 36 so that rotation of oxygen flow 78 promotes heating of oxygen and mixing with fuel. As a result of the flow generated within combustion chamber 28, oxygen to fuel ratio of combustion gas that passes by tap-off opening 48 is oxygen rich. In particular, placement of tap-off opening 48 below but in proximity to fuel port openings 46 promotes a tap-off gas with a relatively high oxygen content. In various embodiments, the relative placement of tap-off opening 48 may be adjusted so that oxygen content is of a desired amount in the composition of gas that enters tap-off opening 48.

Although the present invention has been described in detail, it should be understood that various changes, substitutions and alterations can be made hereto without departing from the spirit and scope of the invention as defined by the appended claims.

What is claimed is:

1. A method for powering an auxiliary system of a liquid rocket engine, the method comprising:
    pressurizing fuel in a fuel manifold to pump the fuel through fuel channels formed in a wall of a combustion chamber and out fuel ports into the combustion chamber;
    injecting oxygen towards the combustion chamber wall from an oxygen injector disposed at a headend of the combustion chamber;
    passing exhaust gas generated by burning fuel from the combustion chamber to a tap-off manifold through tap-off openings formed in the combustion chamber wall;
    locating the fuel ports between the headend and the tap-off openings;
    cooling the tap-off manifold with fuel disposed around the tap-off manifold;
    directing the exhaust gas from the tap-off manifold to the auxiliary system; and
    powering the auxiliary system with the exhaust gas.

2. The method of claim 1 further comprising:
    directing at least some of the fuel from the fuel channels into the tap-off openings.

3. The method of claim 2 wherein the directing at least some of the fuel further comprises interfacing the fuel channel and tap-off opening with an elliptical-shaped opening formed between the fuel channel and the tap-off opening.

4. The method of claim 1 wherein the auxiliary system comprises a turbopump, the method further comprising:
    pumping the fuel into the fuel manifold with the turbopump;
    pumping the oxygen to the oxygen injector with the turbopump; and
    directing exhaust of the turbopump to an exhaust from the combustion chamber.

5. The method of claim 1 wherein:
    at least some of the oxygen injects along the headend substantially perpendicular to the combustion chamber wall; and
    exhaust entering the tap-off openings has an oxygen-rich composition.

6. The method of claim 5 wherein fuel directed into the tap-off opening mixes with the exhaust to establish a substantially volume distributed combustion.

* * * * *